(12) United States Patent
Liang et al.

(10) Patent No.: US 10,558,698 B2
(45) Date of Patent: Feb. 11, 2020

(54) LYRIC PAGE GENERATION METHOD AND LYRIC PAGE GENERATION APPARATUS

(71) Applicant: Tencent Technology (Shenzhen) Company Limited, Shenzhen (CN)

(72) Inventors: Zhu Liang, Shenzhen (CN); Hongcheng Fu, Shenzhen (CN); Yao Xu, Shenzhen (CN); Dantong Wang, Shenzhen (CN); Guojin Zhou, Shenzhen (CN); Bo Li, Shenzhen (CN); Shuangyun Jiang, Shenzhen (CN); Cunteng Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/706,388

(22) Filed: Sep. 15, 2017

(65) Prior Publication Data

US 2018/0004740 A1 Jan. 4, 2018

Related U.S. Application Data

(63) Continuation-in-part of application No. PCT/CN2016/082048, filed on May 13, 2016.

(30) Foreign Application Priority Data

Nov. 27, 2015 (CN) .......................... 2015 1 0854218

(51) Int. Cl.
*G06F 17/00* (2019.01)
*G06F 16/40* (2019.01)
(Continued)

(52) U.S. Cl.
CPC .............. *G06F 16/40* (2019.01); *G06F 16/95* (2019.01); *G06Q 50/01* (2013.01); *G10H 1/361* (2013.01); *G10H 2220/011* (2013.01)

(58) Field of Classification Search
CPC .................... G06F 17/30017; G10H 2220/011
See application file for complete search history.

(56) References Cited

U.S. PATENT DOCUMENTS 6,248,946 B1 * 6/2001 Dwek ............... G06F 17/30749
434/307 A
2003/0200452 A1 * 10/2003 Tagawa ..................... G06F 3/16
713/193

(Continued)

FOREIGN PATENT DOCUMENTS

CN 101491062 A 7/2009
CN 102291375 A 12/2011

(Continued)

OTHER PUBLICATIONS

Tencent Technology, ISRWO, PCT/CN2016/082048, Aug. 24, 2016, 5 pgs.

(Continued)

*Primary Examiner* — Scott T Baderman
*Assistant Examiner* — Barbara M Level
(74) *Attorney, Agent, or Firm* — Morgan, Lewis & Bockius LLP

(57) ABSTRACT

The present disclosure discloses a lyrics page generation method and a lyrics page generation apparatus, belonging to the field of network technologies. The method includes: receiving a lyrics page generation instruction, the lyrics page generation instruction being used for instructing to display a lyrics page of a selected multimedia file list; obtaining a lyrics file of at least one multimedia file in the multimedia file list; and generating a lyrics page according to the lyrics file of the at least one multimedia file, the lyrics page (Continued)

including lyrics information of the at least one multimedia file. The present disclosure provides a brand-new lyrics display manner, which can achieve an effect similar to a lyrics book, so that a user can collect lyrics that the user likes, for subsequent appreciation, so that an application becomes more humanistic, and an amount of information that a lyrics page can provide is greatly increased.

17 Claims, 10 Drawing Sheets

(51) Int. Cl.
  *G06F 16/95* (2019.01)
  *G10H 1/36* (2006.01)
  *G06Q 50/00* (2012.01)

(56) References Cited

U.S. PATENT DOCUMENTS

| | | | | |
|---|---|---|---|---|
| 2008/0026355 A1* | 1/2008 | Petef | ............ | G10H 1/365 434/307 A |
| 2009/0165634 A1* | 7/2009 | Mahowald | ............ | G10H 1/368 84/610 |
| 2012/0221975 A1* | 8/2012 | Juristovski | ............ | G06F 17/30026 715/823 |
| 2013/0127899 A1* | 5/2013 | Yan | ............ | G06F 3/14 345/619 |
| 2013/0275506 A1* | 10/2013 | Warner | ............ | H04L 67/22 709/204 |
| 2014/0173530 A1* | 6/2014 | Mesguich Havilio | ............ | G06F 3/04883 715/863 |
| 2015/0046957 A1* | 2/2015 | Li | ............ | H04N 21/47217 725/88 |

FOREIGN PATENT DOCUMENTS

| | | | |
|---|---|---|---|
| CN | 102325208 | A | 1/2012 |
| CN | 102426842 | A | 4/2012 |
| CN | 102667766 | A | 9/2012 |
| CN | 102902759 | A | 1/2013 |
| CN | 103593142 | A | 2/2014 |
| CN | 104409087 | A | 3/2015 |
| CN | 104714716 | * | 6/2015 |
| CN | 104714716 | A | 6/2015 |
| EP | 1785891 | A1 | 5/2007 |

OTHER PUBLICATIONS

Tencent Technology, IPRP, PCT/CN2016/082048, May 29, 2018, 4 pgs.

* cited by examiner

|  |
| --- |
| ⟨　　　My Lyric Book |
| Song　　Details　　[Lyrics Book] |
| More love – Cheng Xiang ▷<br>On that rainy day I laid in your arms<br>My lonely heart takes up everything again<br>Tired and painful, memories surround us<br>Numb heart and numb myself, I face alone again<br>No more love exists any longer<br>Expand ⌄<br><br>Unwilling to be lonely – Sun Lu ▷<br>Through smoke you slowly swallow and spit<br>Your explanation sounds remote to me<br>I anticipate at beginning of our love one day will come<br>when you take back your farewell you leave with me<br>Thanks for your thoughtfulness before breakup<br>Expand ⌄ |

FIG. 6

LYRIC PAGE GENERATION METHOD AND LYRIC PAGE GENERATION APPARATUS

RELATED APPLICATION

This application is a continuation-in-part application of PCT/CN2016/082048, entitled "LYRICS PAGE GENERATING METHOD AND APPARATUS" filed on May 13, 2016, which claims priority to Chinese Patent Application No. 201510854218.8, filed with the State Intellectual Property Office of the People's Republic of China on Nov. 27, 2015, and entitled "LYRIC PAGE GENERATION METHOD AND LYRIC PAGE GENERATION APPARATUS", both of which are incorporated herein by reference in their entirety.

FIELD OF THE TECHNOLOGY

Embodiments of the present disclosure relate to the field of network technologies, and in particular, to a lyrics page generation method and a lyrics page generation apparatus.

BACKGROUND OF THE DISCLOSURE

With the development of network technologies, more multimedia platforms emerge. The multimedia platforms can provide audio-visual entertainment services including audios and videos to people. To make a user be more immersed in a song while listening to the song, a multimedia platform usually provides a lyrics file of the song to attract the user. For example, when a song is played, lyrics information of the song is provided on a player interface. Although this playing-while-displaying manner can make what the user listens to be what the user sees, viewing of lyrics is limited in a playback process of a single song in some degree, and this manner has a relatively great limitation to lyrics display. Therefore, a better way to display lyrics is desirable.

SUMMARY

To address the problem of the existing technology, embodiments of the present disclosure provide a lyrics page generation method and a lyrics page generation apparatus. The technical solutions are as follows:

According to a first aspect, a lyrics page generation method is provided, the method including:

receiving a lyrics page generation instruction, the lyrics page generation instruction being used for generating a lyrics page of a selected multimedia file list;

obtaining a lyrics file of at least one multimedia file in the multimedia file list; and generating a lyrics page according to the lyrics file of the at least one multimedia file, the lyrics page including lyrics information of the at least one multimedia file.

According to another, a lyrics page generation apparatus is provided, the apparatus including:

a receiving module, configured to receive a lyrics page generation instruction, the lyrics page generation instruction being used for instructing to display a lyrics page of a selected multimedia file list;

a lyrics file obtaining module, configured to obtain a lyrics file of at least one multimedia file in the multimedia file list; and a generation module, configured to generate a lyrics page according to the lyrics file of the at least one multimedia file, the lyrics page including lyrics information of the at least one multimedia file.

Beneficial effects brought by the technical solutions of the embodiments of the present disclosure are: the embodiments of the present disclosure provide a brand-new lyrics display manner, which can achieve an effect similar to a lyrics book, so that a user can collect lyrics that the user likes, for subsequent appreciation, so that an application becomes more humanistic, and an amount of information that a lyrics page can provide is greatly increased.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present technology, and a person of ordinary skill in the art may still derive other drawings from these accompanying drawings without creative efforts.

FIG. 6 is a schematic diagram of a lyrics page according to an embodiment of the present disclosure;

DESCRIPTION OF EMBODIMENTS

To make the objectives, technical solutions, and advantages of the present disclosure clearer, the following further describes the implementation manners of the present disclosure in detail with reference to the accompanying drawings.

Figure 1:
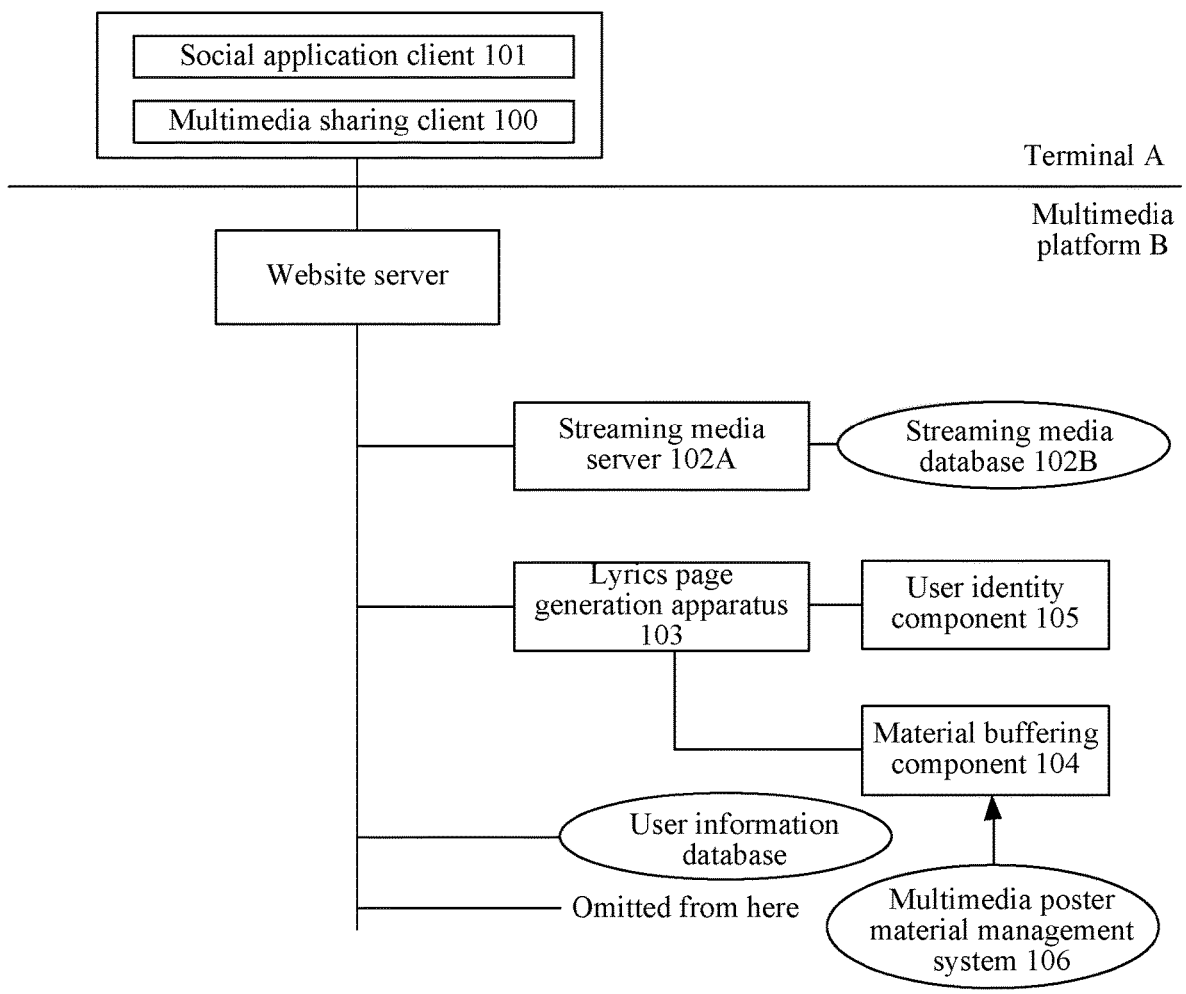
FIG. 1 is a schematic structural diagram of a multimedia sharing system involved in an embodiment of the present disclosure.

FIG. 1 is a schematic structural diagram of a multimedia sharing system involved in an embodiment of the present disclosure. The multimedia sharing system may include a terminal A (e.g., a user device) and a multimedia sharing platform B (e.g., a social network platform provided by a server of a social network).

A multimedia sharing client 100 corresponding to the multimedia platform B may run on the terminal A. A social application client 101 may also run on the terminal A. The multimedia sharing platform may be a platform configured to provide online playing of multimedia files such as audios and videos, for example, a song sharing application platform. This is not specifically limited to this embodiment of the present disclosure.

The multimedia sharing client 100 running on the terminal A may obtain, by means of a network connection with the multimedia sharing platform B, a multimedia file (e.g., a music video, a music file, a video file, etc.) provided by the multimedia sharing platform B and play the multimedia file at the terminal A. The obtaining and playing may be performed based on a website server of the multimedia platform B. An interface that is configured to exchange information with the social application client 101 is provided on the multimedia sharing client 100, so that a user can send to-be-shared information to the social application client 101 by using the interface associated with the multimedia platform B. The to-be-shared information may be, for example, an address link, a picture, a music file, a webpage, a flash file, and the like.

The multimedia sharing client 100 may buffer (e.g., store locally in a local cache) a relevant material used for generating a lyrics page. The multimedia sharing client 100 may compare a time stamp at which the material is buffered and a time stamp at which a lyrics page generation apparatus 103 delivers the material, to pull processing of only the latest material that is not already buffered, to reduce update time consumption and flow consumption for update.

The multimedia sharing platform B may include: a streaming media server 102A, a streaming media database 102B, a lyrics page generation apparatus 103, a material buffering component 104, a user identity component 105, and a lyrics page material management system 106. In some embodiments, some of the functions performed at the server 102A may be performed at each terminal. For example, the generation of the lyrics page for the songs selected at a terminal may be performed at that terminal, with or without additional materials received from the server.

The streaming media server 102A and the streaming media database 102B are configured to provide a streaming media service to the terminal A, for example, sending a streaming media corresponding to a requested streaming media identifier to the terminal according to a request of the terminal for a streaming media. The streaming media may be a live stream or may be a streaming media file. This is not limited to this embodiment of the present disclosure.

The lyrics page generation apparatus 103 consists of systems such as a material buffering component 104 and is configured to provide lyrics page obtaining, producing, and sharing services.

The material buffering component 104 is configured to provide materials, such as a background file (e.g., background textures and images) and a font form (e.g., various stylized fonts), to production of a lyrics page. The background file may include a dynamic background file and a static background file. Other materials may also include a dynamic material and a static material. Dynamic materials include materials that are animated, or updated from time to time with content retrieved from the Internet, or when the lyrics page is displayed each time. For example, in some embodiments, the dynamic content includes the latest tour information for an artist that is retrieved from the artist official page, each time the lyrics page for a song of that artist is displayed on a terminal. In some embodiments, the dynamic content includes program code that is triggered and executed when certain criteria (e.g., when the current time is on the weekend, or when the current user subscribes to the public account of the artist, etc.) are met at the time that the lyrics page is displayed. In some embodiments, the dynamic content is updated when the original author of the lyrics page requests an update to the lyrics page through the multimedia platform server (e.g., to update a photo, a background, or a text editorial content), and the update is automatically loaded when the lyrics page is subsequently shared to other users on the multimedia platform and/or displayed by other users on the multimedia platform.

Further, the material buffering component 104 may also store a user permission corresponding to the material, to provide more abundant and more specific materials to some users at relatively high levels. Optionally, the material buffering component 104 may be a cloud memory (CMEM) component and can provide a high performance in-memory persistent storage service. Certainly, the material buffering component 104 may also be another storage carrier, such as mysql or oracle. In some embodiments, the same lyrics page load different dynamic content depending on the privilege levels of the users that are displayed in the particular lyrics page. For example, the lyrics page may load photos with a first resolution when it is displayed on a device of a user with a first privilege level, and may load photos with a second resolution (e.g., higher) when it is displayed on a device of a user with a second (e.g., lower) privilege level. In some embodiments, more or less content may be loaded to the lyrics page depending on the privilege levels of the users. In some embodiments, the server checks the privilege level of the different users and returns different materials (e.g., amount and/or type) for the same dynamic content in the lyrics page displayed to the different users. In some embodiments, the client terminals checks the privilege level of its own user, and requests different materials for the same dynamic content in the lyrics page when displaying the lyrics page to the user of the client terminal.

The lyrics page material management system 106 is configured to regularly update, based on uploading of an administrator or a user, to the material buffering component 104 a material updated in a database of the lyrics page material management system 106, so that the material buffering component 104 can provide a terminal to the lyrics page generation apparatus 103 when responding to an obtaining request of the lyrics page generation apparatus 103, saving a process for querying the database of the lyrics page material management system 106, so as to accelerate a process for loading a material.

The user identity component 105 is configured to provide functions such as user permission query, and may provide corresponding information, such as permission, of any user identifier to the lyrics page generation apparatus 103 in response to a query of the lyrics page generation apparatus 103.

It should be noted that the foregoing system compositions are merely brief introductions to some functional compositions in the system. The multimedia sharing system may further include compositions having other functions, such as a user information database and a user relation database. This is not specifically limited to this embodiment of the present disclosure. The foregoing all optional technical solutions may be randomly combined to form optional embodiments of the present disclosure and are not described in detail one by one herein.

Figure 2:
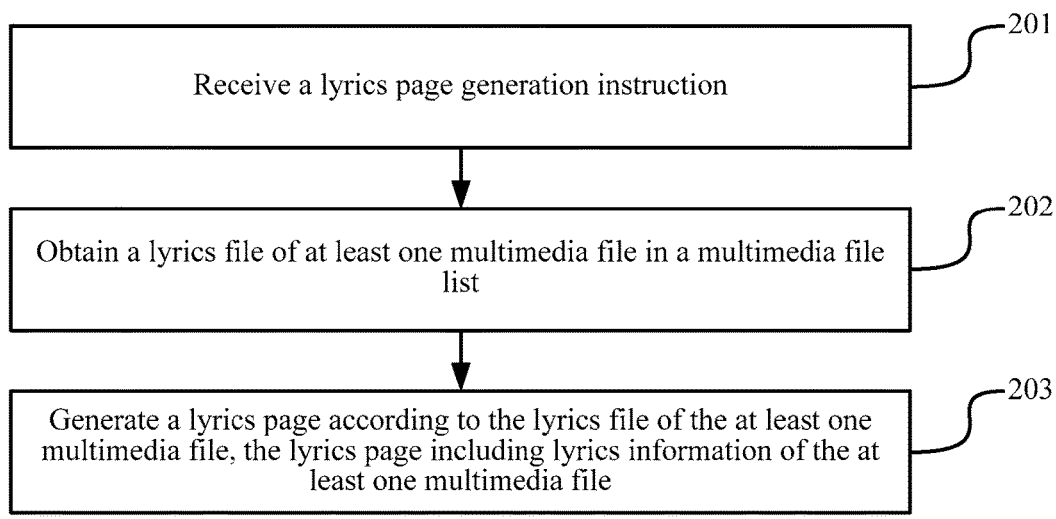
FIG. 2 is a flowchart of a lyrics page generation method according to an embodiment of the present disclosure.

FIG. 2 is a flowchart of a lyrics page generation method according to an embodiment of the present disclosure. Referring to FIG. 2, this embodiment includes:

201: Receive a lyrics page generation instruction (e.g., receiving a user input selecting a song in a list of songs, or selecting a playlist with multiple songs from a listing of playlists), the lyrics page generation instruction being used for generating a lyrics page of a selected multimedia file list (e.g., a listing of songs, or a listing of playlists, or a listing of music stations, etc.).

202: Obtain a lyrics file of at least one multimedia file (e.g., the lyrics file includes the full lyrics of the at least one multimedia file in plain text format) in the multimedia file list.

203: Generate a lyrics page according to the lyrics file of the at least one multimedia file, the lyrics page including lyrics information of the at least one multimedia file. The lyrics page includes all or part of the full lyrics of the at least one multimedia file from the lyrics file, and includes other content, such as a background image, one or more media clips for portions of the song that correspond to the included portions of the lyrics, and one or more images, clip art, textual descriptions of the song provided by the authors of the lyrics page, In some embodiments, the lyrics information also includes dynamic content such as comments (e.g., textual or graphical comments) from one or more other users that have viewed the lyrics page, provided that the author has granted permission to make the lyrics page open to comments. In some embodiments, only selected comments are displayed on the lyrics page when the lyrics page are viewed by users. In some embodiments, the comments is scrolled when the lyrics page is displayed to users. In some embodiments, the newest comments are displayed, and the oldest comments are phased out when new comments are added by users viewing the lyrics page from their individual terminals. In some embodiments, the comments are updated in real-time as the lyrics page is displayed to multiple users on separate terminals at the same time and as the users make comments on the lyrics page through the multimedia platform.

In some embodiments, when the lyrics page is generated by the server in response to the lyrics page generation instruction (e.g., the user's input to select the page, and the users inputs and selection of materials to construct the lyrics page), the lyrics page is displayed to the device of the author of the lyrics page (e.g., the user who initiated the request to generate the lyrics page), and subsequent to other users (e.g., through publication or sharing of the lyrics page by the author on the multimedia platform).

The embodiments of the present disclosure provide a brand-new lyrics display manner, which can achieve an effect similar to a lyrics book, so that a user can collect lyrics that the user likes, for subsequent appreciation, so that an application becomes more humanistic, and an amount of information that a lyrics page can provide is greatly increased.

In a possible implementation, the lyrics information displayed on the lyrics page is lyrics information of a specified part of the multimedia file of the at least one multimedia file, and after the generating a lyrics page according to the lyrics file of the at least one multimedia file, the method further includes:

loading and displaying lyrics information of one or more portions of the multimedia file other than the specified part of the multimedia file of the at least one multimedia file on the lyrics page according to a first predefined operation of a user on the lyrics page.

In a possible implementation, the lyrics information displayed on the lyrics page is a part, less than all, of lyrics information of the at least one multimedia file, and after the generating a lyrics page according to the lyrics file of the at least one multimedia file, the method further includes:

according to a second predefined operation of a user on lyrics information of any multimedia file of the at least one multimedia file, loading and displaying complete lyrics information of the multimedia file on the lyrics page. For example, the lyrics page initially displays only a small portion of the lyrics that is selected by the author, or that is the most popular and well known portion of the lyrics. When a downward swipe is detected on the displayed portion of the lyrics, the other previously un-displayed portions of the lyrics are displayed. In some embodiments, when providing the input to generate the lyrics page, the author selects the portion of the lyrics that should be displayed on the lyrics page, and the selected portion of the lyrics is displayed with a clip that starts from a point in the multimedia file that corresponds to the beginning of the selected portion of the lyrics in the lyrics page.

In a possible implementation, after the generating a lyrics page according to the lyrics file of the at least one multimedia file, the method further includes:

jumping to a multimedia poster editing page if a third predefined operation of a user on lyrics information of any multimedia file of the at least one multimedia file is detected; and loading and displaying lyrics information corresponding to the third predefined operation on the multimedia poster editing page. For example, if the user taps on the lyrics portion of the lyrics page, or if the user swipes horizontally on the lyrics page, the lyrics page rotates and flips over to show a poster page, where the poster page includes official album information for the album containing the song corresponding to the lyrics page.

In a possible implementation, the method further includes:

obtaining a lyrics page production resource, the lyrics page production resource including multiple background files; and obtaining, from the multiple background files, a specified background file selected by a user; and correspondingly, the generating a lyrics page according to the lyrics file of the at least one multimedia file includes:

generating the lyrics page of the at least one multimedia file according to the specified background file and the lyrics file of the at least one multimedia file. In some embodiments, the server has a library of uploaded content (e.g., text, poems, proses, media files, images, art, gifs, etc.) for the same theme or song, or the same portion of a song, and the server suggests one or more of the content to the user during the construction of the lyrics page based on the song, or portions of the song that the user has selected.

In a possible implementation, the method further includes: sharing the lyrics page to a target platform if a sharing operation on the lyrics page is detected. In some embodiments, the server provides a search function for searching the library of content for construction of a lyrics page. In some embodiments, once a lyrics page is completed, and the author of the lyrics page activated the permission to share the components of the lyrics page, the components of the lyrics page is extracted from the lyrics page and cataloged based on the song title, song lyrics, and keywords, as well as any description that the author has put in for the lyrics page. In some embodiments, the lyrics pages that have been published or shared are made searchable as well, and a user can search and find the lyrics pages for a particular song, a particular theme, a particular artist, or keywords related to the song, the lyrics, the artistic, the theme, the genre, etc. In some embodiments, the search performed by a particular user is automatically confined to lyrics pages published or shared by other social network contacts of the particular user to users that follow the same public accounts corresponding to the song or artist of the lyrics page.

Figure 3:
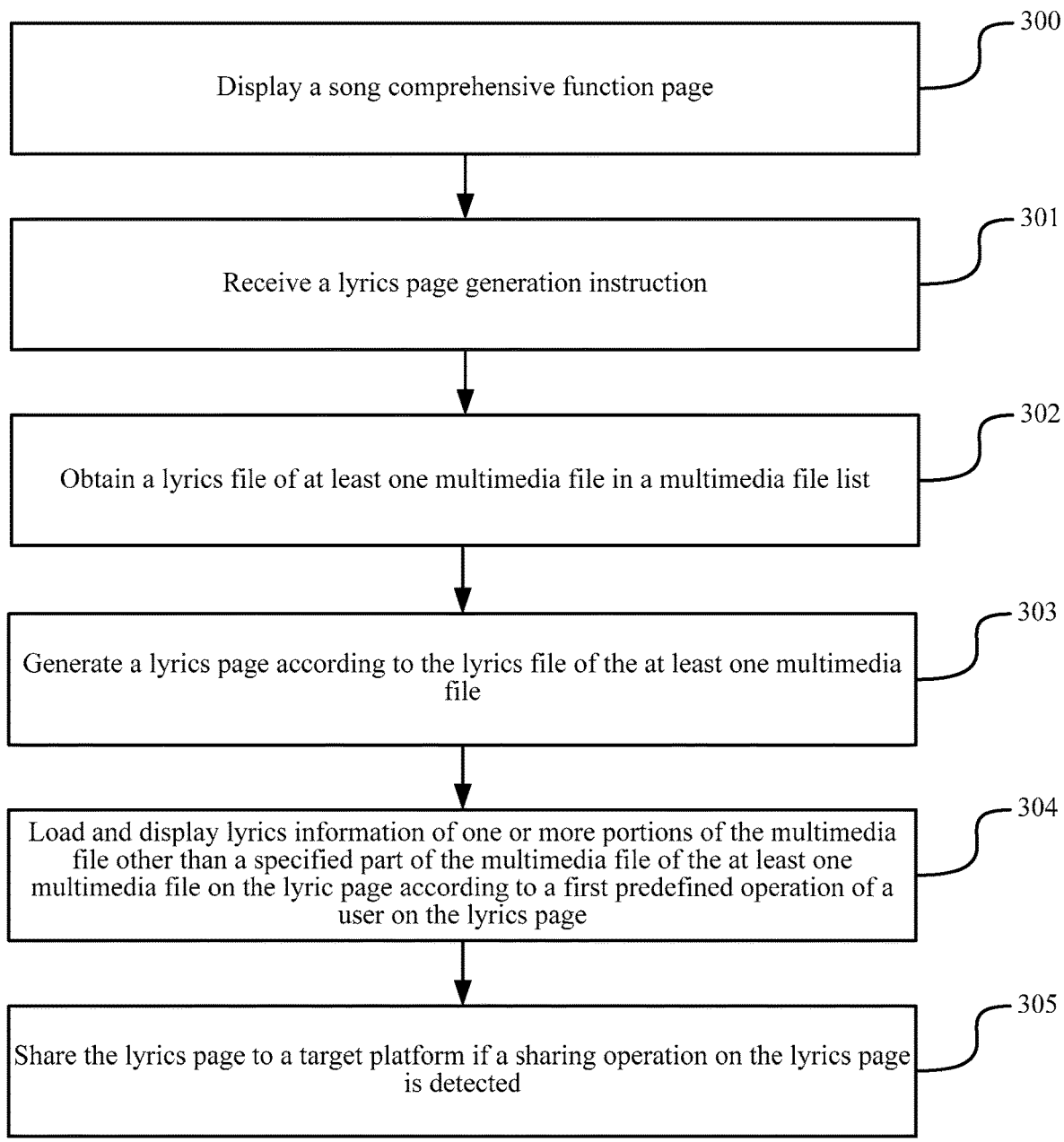
FIG. 3 is a flowchart of a lyrics page generation method according to an embodiment of the present disclosure.

FIG. 3 is a flowchart of a lyrics page generation method according to an embodiment of the present disclosure. Referring to FIG. 3, this embodiment specifically includes:

300: Display a song comprehensive function page, the song comprehensive function page including at least one multimedia file list.

Figure 4:
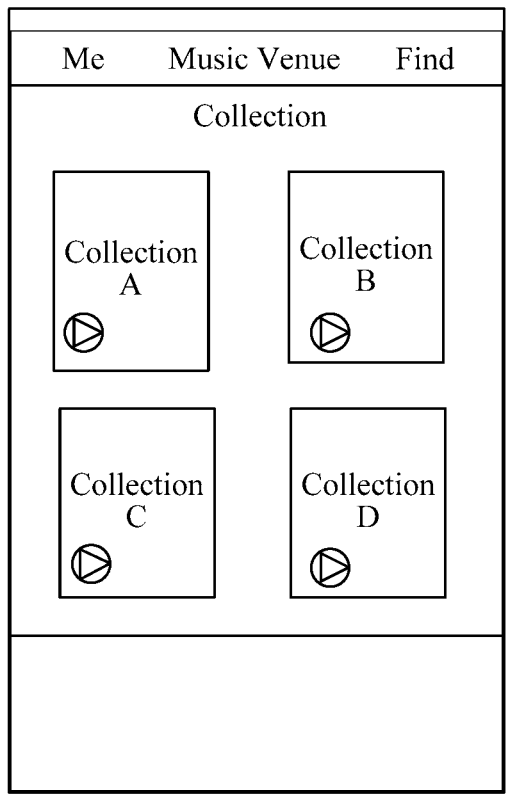
FIG. 4 is a schematic diagram of a song comprehensive function page according to an embodiment of the present disclosure.

The song comprehensive function page may be a page used for displaying the multimedia file list, for example, an album list page, a recommendation list page, a collection page, a personal favorite page, or a personal preference page. For example, the song comprehensive function page may be a collection page shown in FIG. 4. The collection page includes multiple collections. Each collection may display a cover picture of the collection and a name of the collection. In addition, a listening option, a favorite option, and the like may be provided on the cover picture of each collection, to implement functions of listening, favorite, and the like of the collection. Certainly, data such as a quantity of listening people and a quantity of favoring people may also be provided on the cover picture, for user's reference.

301: Receive a lyrics page generation instruction, the lyrics page generation instruction being used for generating a lyrics page of a selected multimedia file list.

Figure 5:
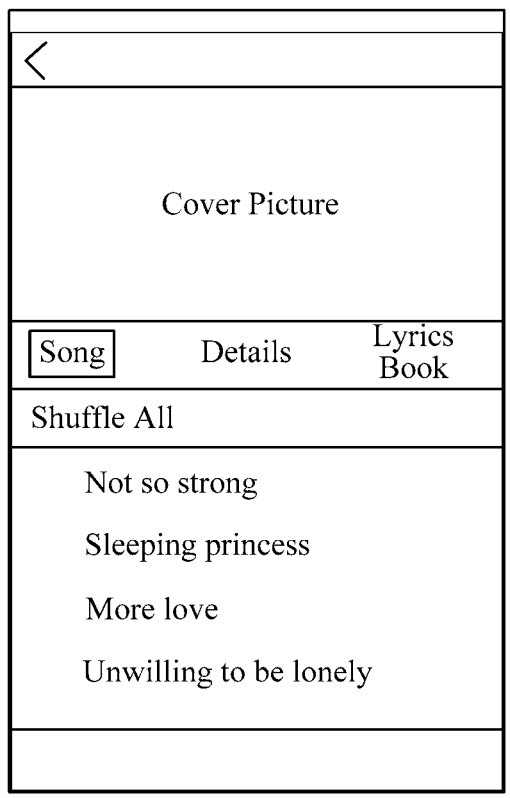
FIG. 5 is a schematic diagram of a multimedia file list page according to an embodiment of the present disclosure.

When a user wants to listen to any multimedia file list, the user may perform a click operation on the multimedia file list on the song comprehensive function page, so as to display the multimedia file list page. The multimedia file list page may provide not only a listening function of all songs in the list but also functions such as listening of each song in the list. A lyrics page function is also provided on the multimedia file list page. Refer to an exemplary page in FIG. 5 for the multimedia file list page. A "lyrics book" option is an option corresponding to the lyrics page function in this embodiment of the present disclosure. When detecting a trigger operation on the option, a client confirms that the lyrics page generation instruction is received.

302: Obtain a lyrics file of at least one multimedia file in the multimedia file list.

When the lyrics page generation instruction is received, the lyrics page generation apparatus may send a lyrics obtaining request to a streaming media server on a multimedia sharing platform, the lyrics obtaining request carrying a file identifier of at least one multimedia file. When receiving the lyrics obtaining request, the streaming media server obtains a lyrics file corresponding to the file identifier of the at least one multimedia file from a streaming media database and returns the obtained lyrics file to the lyrics page generation apparatus.

303: Generate a lyrics page according to the lyrics file of the at least one multimedia file, the lyrics page including lyrics information of the at least one multimedia file.

The lyrics file may include only lyrics information, to display the lyrics information. Alternatively, the lyrics file may include the lyrics information and a lyrics display time label.

The lyrics page may be displayed in a form of discrete pages, that is, the lyrics page may include multiple discrete pages. The lyrics information of the at least one multimedia file is separately displayed on each discrete page. To save display space and help the user appreciate, lyrics information of two multimedia files may be displayed on one discrete page, as shown in FIG. 6.

Further, when the lyrics page is displayed, to save display space, the lyrics information may be displayed in a folded manner (as shown in FIG. 6), that is, only a part of lyrics information of each multimedia file is displayed. Therefore, to ensure integrity of display, an expansion function may be provided, that is, according to a second predefined operation of a user on lyrics information of any multimedia file of the at least one multimedia files, complete lyrics information of the multimedia file is loaded and displayed on the lyrics page. The second predefined operation may be a click operation, a double-click operation, a slide operation, or the like. This is not limited to this embodiment of the present disclosure. Certainly, alternatively, the second predefined operation may be any operation performed on the expansion option (as shown in FIG. 6) provided on lyrics information of each multimedia file on the lyrics page.

It should be noted that when the lyrics page is generated, a background file may be loaded for the lyrics page. The background file may be a background file defaulted by a system or may be a background file that is set by the user according to user's preferences, and the background file may be a dynamic file or a static file. This is not limited to this embodiment of the present disclosure. The lyrics page may be a dynamic display page (such as a flash file) or a static display page. Certainly, if the client does not support flash display, a display effect may be completed by using HTML5.

304: Load and display lyrics information of one or more portions of the multimedia file other than a specified part of the multimedia file of the at least one multimedia file on the lyrics page according to a first predefined operation of a user on the lyrics page.

Because the lyrics page is displayed in a form of discrete pages, the current discrete pages provide only lyrics information of a specified part of the multimedia file. Therefore, to make an operation manner be more flexible, the discrete pages may be switched in a manner of sliding up and down, that is, if detecting a first predefined operation on the lyrics page, the client may load and display lyrics information of other multimedia files corresponding to a sliding direction according to the sliding direction of the first predefined operation. For example, when the sliding direction of the first predefined operation is sliding upwards, lyrics information of current at least one multimedia file after the multimedia file is displayed is loaded. The first predefined operation may be a slide operation, a drag operation, and the like. This is not specifically defined in the present disclosure.

It should be noted that when the lyrics file is obtained in step 302, the lyrics file of the specified part of the multimedia file in the multimedia file list may be first obtained, so as to display lyrics information of the specified part of the multimedia file on a current page when the lyrics page is displayed in discrete pages in step 303. When it is detected that the user wants to perform page switching in step 304, step 302 is performed again to obtain a lyrics file of another specified part of the multimedia file, so as to display the lyrics page. In this way, a lyrics file of a multimedia file corresponding to to-be-displayed discrete pages is obtained every time the first predefined operation is performed, thereby avoiding stuckness due to pulling of excessive lyrics files once and improving system stability. In another embodiment, when the lyrics file is obtained, a list identifier of the multimedia file list may be sent to the streaming media server, so that the streaming media server obtains a multimedia file identifier in the multimedia file list according to the list identifier, so as to return the lyrics file of the multimedia file identifier to the client according to the multimedia file identifier. It should be noted that in an obtaining and returning process, the lyrics file may be obtained in batches according to a preset quantity, that is, a lyrics file of a specified part of the multimedia file is obtained, and then a lyrics file of another specified part of the multimedia file is obtained when the first predefined operation is detected. Similarly, as a result, stuckness due to pulling of excessive lyrics files once is avoided, and system stability is improved.

It should be noted that when the lyrics file is obtained, a streaming media address corresponding to the multimedia file may also be obtained. Correspondingly, a playback option for the multimedia file may also be provided within a preset range of the lyrics information displayed on the lyrics page, so that the user may quickly play a song by using the playback option. In a playing process, the page may not be switched, but the lyrics information rolls on the lyrics page according to a play progress. Certainly, to make the user learn detailed information about the multimedia file, a detail page of the multimedia file may also be switched to. This is not limited to this embodiment of the present disclosure.

If a fourth predefined operation of the user on any row of lyrics information on the lyrics page is detected, the multimedia file may be played, and the play progress is adjusted to a playing time of a lyrics corresponding to the fourth predefined operation, so that the user can view the lyrics while appreciating a song segment preferred by the user.

Further, to provide a richer editing function to the user, a multimedia poster may be edited based on the lyrics page. Correspondingly, after step 303, the method further includes the following step: jumping to a multimedia poster editing page if a third predefined operation of a user on lyrics information of any multimedia file of the at least one multimedia file is detected; and loading and displaying lyrics information corresponding to the third predefined operation on the multimedia poster editing page.

The third predefined operation may be a hold operation on a lyrics information display area. Certainly, alternatively, the third predefined operation may be any operation performed on a poster editing option provided by the lyrics information of the multimedia file. This is not limited to this embodiment of the present disclosure.

When the third predefined operation is detected, the multimedia poster editing page may be jumped to, to obtain a poster resource, such as a background file, a multimedia file, and a font display form, of a multimedia poster used for editing the multimedia file, and the lyrics information corresponding to the third predefined operation is loaded to the multimedia poster editing page. The lyrics information corresponding to the third predefined operation may be complete lyrics information of the multimedia file, lyrics information within a current row corresponding to a touch position of the third predefined operation, or lyrics information within a preset quantity of rows corresponding to a touch position of the third predefined operation. For example, referring to FIG. 6, the touch position of the third predefined operation falls within the row "when you take back your farewell you leave with me". Therefore, during loading, a previous row, the current row, and a next row are all loaded to the multimedia poster editing page. This is not limited to this embodiment of the present disclosure.

305: Share the lyrics page to a target platform if a sharing operation on the lyrics page is detected.

The user may share the lyrics page to the target platform, such as a social application platform, according to requirements of the user. This is not limited to this embodiment of the present disclosure. During sharing, a page link of a to-be-shared lyrics page is sent to the target platform, so that the target platform can generate a preview image of the lyrics page according to the page link and maps the page link by using the preview image, so that another user can open the lyrics page by using a viewing operation. Certainly, sharing of the lyrics page may also be merely sharing of a current page screenshot. That is, the page link thereof is not sent to the target platform, but the page screenshot of the lyrics page is sent to the target platform, so that another user can learn, by using the page screenshot, a multimedia file that the user is interested in.

When the lyrics page is a dynamic display page (such as flash), and the target platform to which the lyrics page is shared to does not support dynamic display, the target platform may display the lyrics page as a link. The user clicks the link, and the dynamic lyrics page is displayed in a browser.

Figure 7:
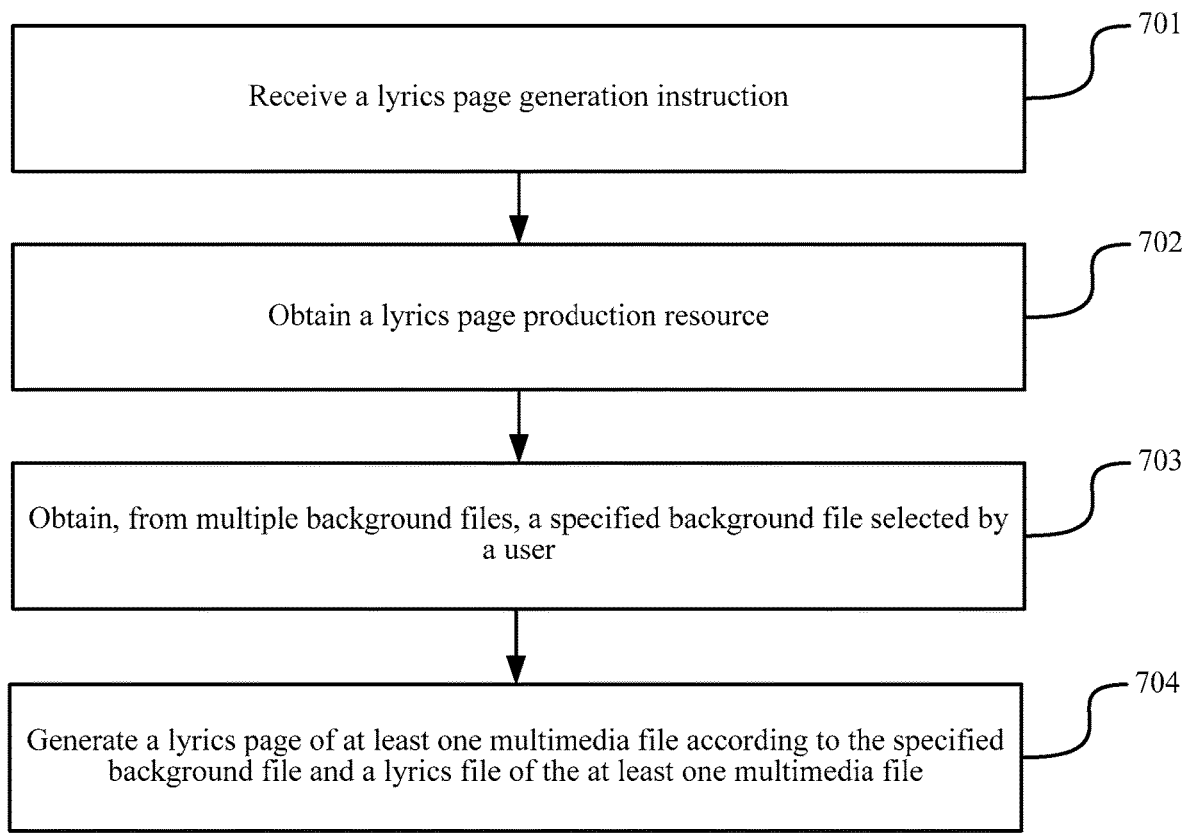
FIG. 7 is a flowchart of a lyrics page generation method according to an embodiment of the present disclosure.

It should be noted that the lyrics page generation method may also include a process for producing the lyrics page according to preferences of the user, that is, the client provides a function for producing the lyrics page, and the user can produce lyrics information of multiple multimedia files in any multimedia list selected by the user as the lyrics page, for subsequently viewing by the user or sharing the lyrics page to friends. The foregoing embodiment is described by using that the background file is generated by default as an example when the lyrics page is generated. In an actual using process, the user may also produce the lyrics page according to a lyrics page production resource provided by a material buffering component. The present disclosure is further described below by using a page production process as an example. FIG. 7 is a flowchart of a lyrics page generation method according to an embodiment of the present disclosure. Referring to FIG. 7, this embodiment specifically includes:

701: Receive a lyrics page generation instruction, the lyrics page generation instruction being used for generating a lyrics page of a selected multimedia file list.

In this embodiment, the selected multimedia file list may refer to a favorite list of the user or a list of another form. The list of another form may include: a multimedia file list formed by multimedia files to which an attribute label is added. The user may select any attribute label, so that the multimedia files to which the attribute label is added are considered as a multimedia file list. For example, the user may select a song preferred by the user (such as a song on which a "like" operation is performed), so that the multiple preferred songs are considered as a multimedia file list, and subsequently, a lyrics page is generated according to the multiple preferred songs.

Figure 8:
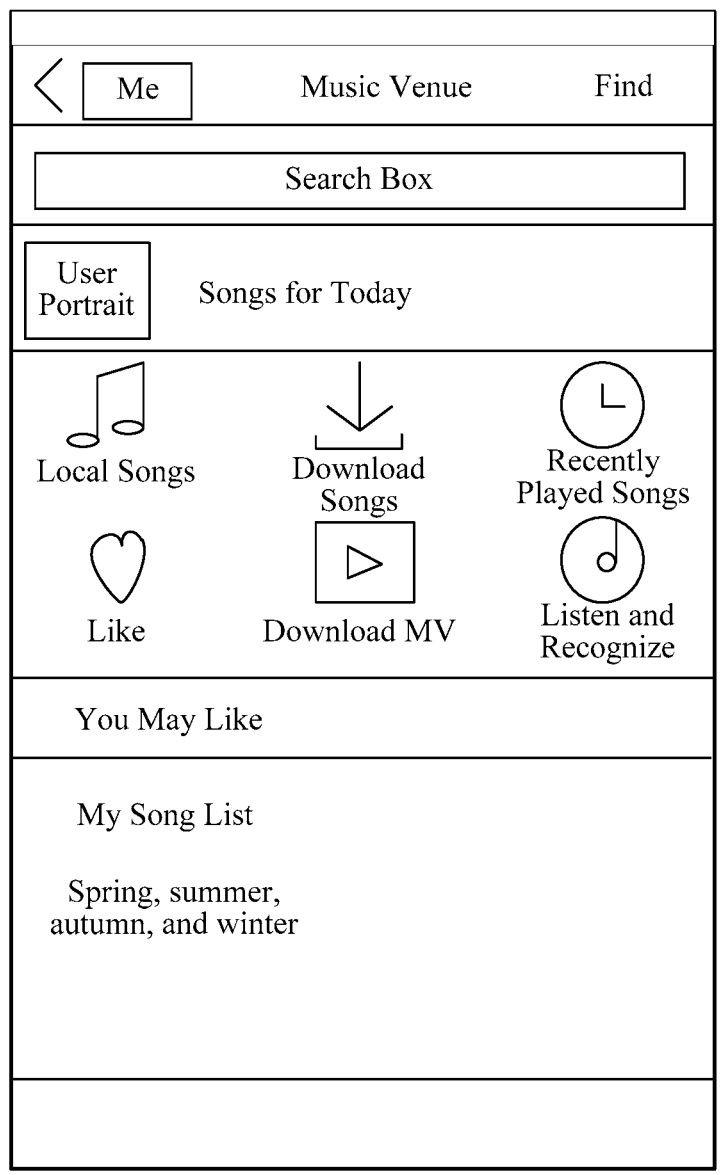
FIG. 8 is a schematic diagram of a user song page according to an embodiment of the present disclosure.

For example, referring to FIG. 8, FIG. 8 is a schematic diagram of a user song page according to an embodiment of the present disclosure. The user song page may include multiple multimedia file lists associated with the user, for example, a local song list, a download song list, recently played song list, my preferred song list, and other song lists, and certainly, may include a song list produced by the user, and the like. The user may generate a lyrics book of the user based on any of the foregoing lists.

702: Obtain a lyrics page production resource, the lyrics page production resource including multiple background files.

The background file may be a static picture, a dynamic picture, some flash files, and the like. This is not limited to this embodiment of the present disclosure.

703: Obtain from the multiple background files a specified background file selected by a user.

The user may select, from the multiple displayed background files by using a selection operation, a background file that the user wants to use, so as to implement a self-defined production process.

Certainly, when the specified background file is selected, other display elements such as a display font of the lyrics information and a page display position may also be selected, to enrich display forms.

704: Generate the lyrics page of the at least one multimedia file according to the specified background file and the lyrics file of the at least one multimedia file.

A specific form of the lyrics page may be similar to the form of the lyrics book shown in FIG. 6 and is not described in detail herein.

In an embodiment of the present disclosure, if the user wants to produce a dynamic lyrics page, the user may select a dynamic background file or select a dynamic display manner when selecting the background file. after the dynamic display manner is selected, the client may send an identifier of the background file and an identifier of the multimedia file list (or multiple multimedia file identifiers) to the multimedia sharing platform, so that the multimedia sharing platform can call an SWF complier to compile materials such as the lyrics file (such as an optimized row columnar (QRC) file) and the background file and a complied ActionScript bytecode file to synthesize an SWF file, and finally sends the synthesized SWF file to the client. Based on the dynamic lyrics page, during a display process, any multimedia file displayed on the lyrics page may be simultaneously played, so that the user can hear a song corresponding to the segment of lyrics content, achieving unity of the visual sense and hearing sense and bringing better audiovisual feelings. The foregoing process may be accomplished by the client and a server together or may be completely accomplished at the client. That is, the server is configured only to provide used resources, and actual processes such as synthesis are accomplished by the client. This is not specifically defined in this embodiment of the present disclosure.

After the lyrics page is generated, the lyrics page may be added to an existing lyrics page list of the user. The addition may adding the generated lyrics page as a discrete page to an existing lyrics page, or may be adding to the lyrics page list in a form of an independent page according to a self-defined name of the user. This is not specifically defined in this embodiment of the present disclosure.

Certainly, the user may also set a cover, a page-flip effect, and the like for the lyrics page, or may perform editing such as page separation on the stored lyrics page list, so that the lyrics page presents an effect of an exquisite poster, that is, having a cover and a page-flip effect, and being capable of setting a preferred font.

Optionally, the lyrics page may also load a multimedia file or a multimedia segment of the displayed lyrics information, so as to play a preferred song and lyrics segment at any time. Further, the lyrics page may further provide interfaces such as a sing-along function interface, a karaoke application interface, and a listen-and-recognize interface, so that the user can add a song preferred by the user to the lyrics page list at any time by using another application. The foregoing interfaces are merely descriptions of examples. In an actual application, other application interfaces may also be provided. This is not specifically defined in this embodiment of the present disclosure.

Certainly, with reference to any of the foregoing embodiments, after the lyrics page is generated, the lyrics page may also be uploaded to the server, and the server rewards to the uploading user. For example, the server may issue rewards, such as points and virtual money, to the user according to the lyrics page uploaded by the user, to increase participation of the user. Alternatively, the server may issue a reward of any form to the user according to conditions such as a downloaded condition or a liked condition of the lyrics page in an issuing state.

Further, with reference to any of the foregoing embodiments, after the lyrics page is generated, the lyrics page shared by the user is reported to the multimedia sharing platform, so that the multimedia sharing platform can deduce multimedia file preferences of the user according to multimedia lyrics content in the lyrics page, the background file, and the like of the user, so as to subsequently provide a more accurate recommendation service to the user.

Figure 9:
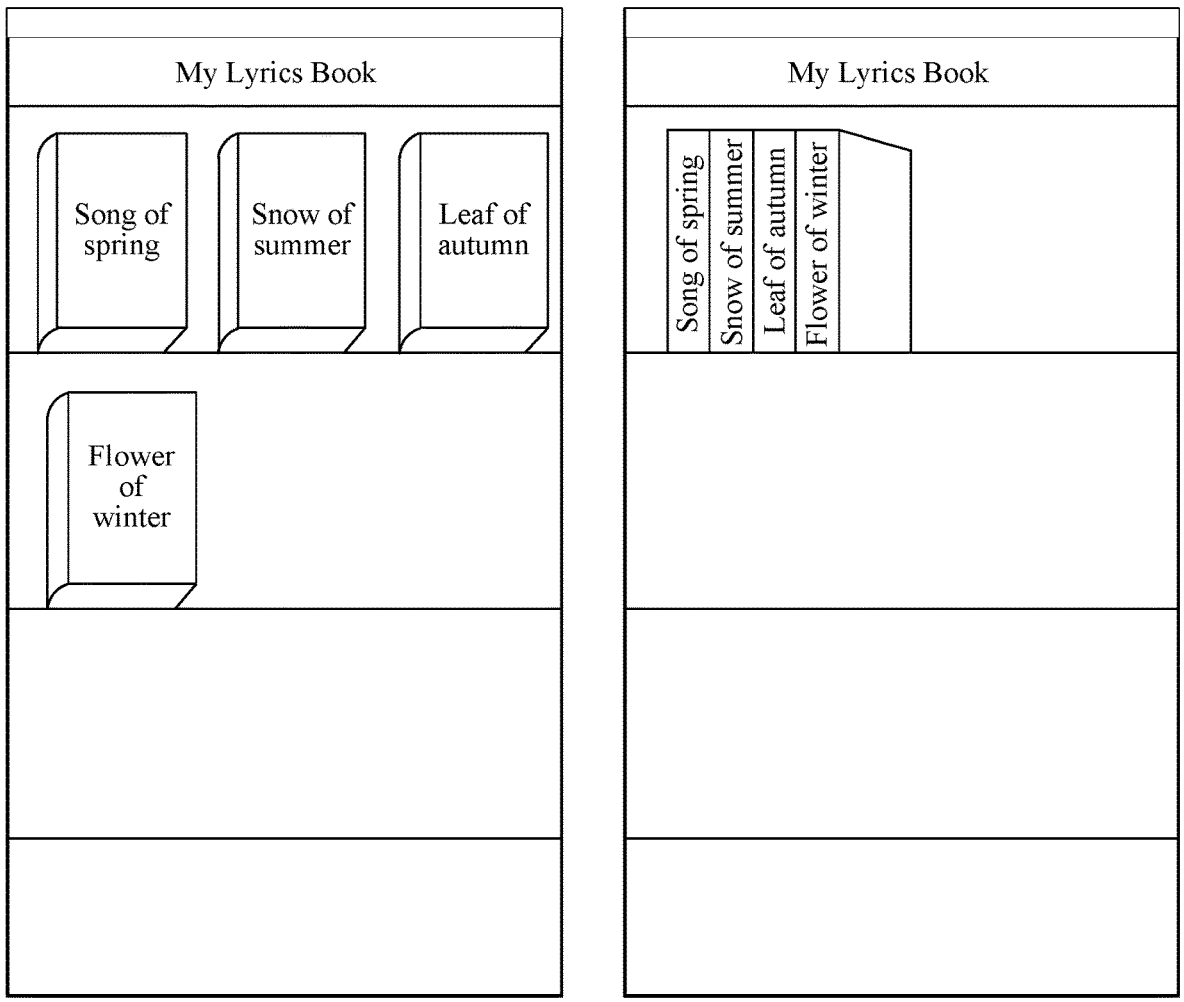
FIG. 9 is a schematic diagram of a display page of a lyrics page according to an embodiment of the present disclosure.

Certainly, the lyrics page generation apparatus may run as an independent client. Different lyrics pages may be displayed as different files, so that the user can see lyrics pages like seeing books on a bookshelf (referring to FIG. 9) when opening the apparatus. Each lyrics page may perform cover display according to a cover selected by the user. In addition, in a display process, each lyrics page may change a display form according to editing operations, such as font switching, of the user, and may has a dynamic page-flip effect. For example, lyrics information of a multimedia file is displayed on each page.

Further, the lyrics page generation apparatus may provide a classification function. The user may set multiple categories according to preferences of the user and store the generated lyrics page to different categories, so as to display the lyrics page according to categories.

Figure 10:
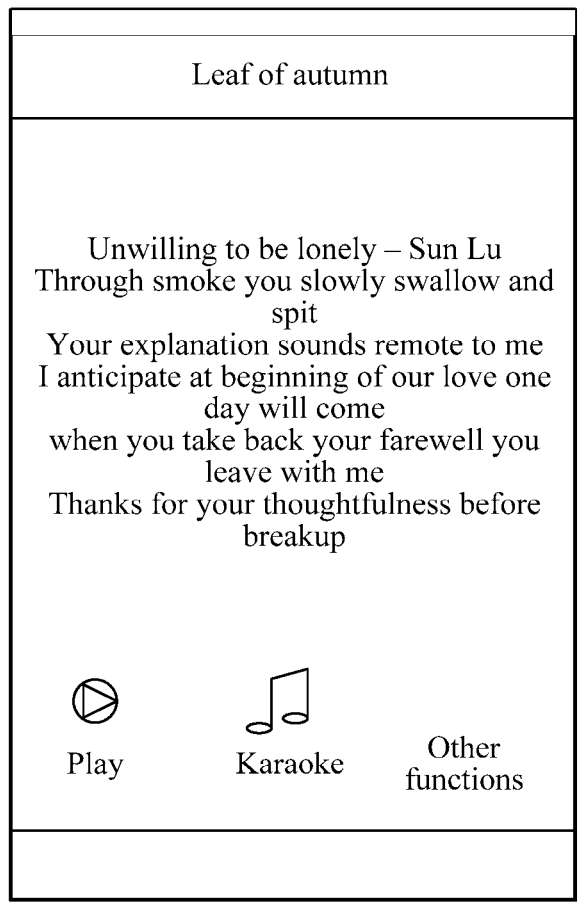
FIG. 10 is a schematic diagram of a discrete page of a lyrics page according to an embodiment of the present disclosure.

Further, on the lyrics page, each multimedia file provides a play function, a karaoke function, or the like (referring to FIG. 10), so that the user can play the multimedia file while appreciating a lyrics. A specific display mode is similar to display provided in the foregoing embodiment and is not described in detail herein.

Optionally, the multimedia file in the multimedia file list and the lyrics information in the lyrics page may be synchronously updated and processed, and specific processing may be as follows: when an adding instruction of adding a first multimedia file to the multimedia file list is received, adding the first multimedia file in the multimedia file list, and adding lyrics information of the first multimedia file in the lyrics page; or when a deletion instruction of a first multimedia file in the multimedia file list is received, deleting the first multimedia file from the multimedia file list, and deleting lyrics information of the first multimedia file from the lyrics page.

During implementation, after the lyrics page is generated corresponding to a particular multimedia file list, the lyrics page and the multimedia file list may be bonded. That is, when receiving an adding instruction of adding a multimedia file (that is, the first multimedia file) to the multimedia file list, the terminal may add the multimedia file to the multimedia file list, search in the corresponding lyrics page whether lyrics information corresponding to the first multimedia file exists, and if lyrics information corresponding to the first multimedia file does not exist, add the lyrics information corresponding to the first multimedia file to the lyrics page. Similarly, when receiving a deletion instruction of a multimedia file (that is, the first multimedia file) in the multimedia file list, the terminal may delete the multimedia file from the multimedia list, may search in the corresponding lyrics page whether lyrics information corresponding to the first multimedia file exists, and if lyrics information corresponding to the first multimedia file exists, may delete the lyrics information corresponding to the first multimedia file from the lyrics page. Certainly, the foregoing steps may be automatically accomplished by the terminal, or a prompt message is sent before adding/deletion, to prompt the user to select whether to allow the terminal to perform the foregoing processing.

In some embodiments, when the lyrics page is displayed at a terminal, an input directed to a particular line of the displayed lyrics is detected, in response to the input, the media playback is automatically started from a portion of the media file that corresponds to that line of the lyrics. In some embodiments, the lyrics page provides an associated function for recording a user's rendition of the song. For example, when an input from the user for starting a recording is started, karaoke music for the song is started (e.g., started from the portion of music accompaniment that corresponds to the start of the selected lyrics or the displayed portion of the lyrics), and recording of the user's voice input is started at the same time. When the recording is completed, the recording is stored in association with the lyrics page, so that it is searchable as part of the lyrics page. In some embodiments, when a user selects a portion of the lyrics in the lyrics page (e.g., tap on a particular line or segment of the lyrics in the lyrics page), the terminal automatically determines whether to playback the original media file or the recorded media of the user. In some embodiments, the determination is based on whether the user has the necessary permission (e.g., copyright or other authorizations) to playback or share the original media file or the user recorded version of the media. In some embodiments, the starting location of the playback is also based on the portion of the lyrics that is interacted with by the user.

In some embodiments, when the user chooses to playback the original media, a recording function is invoked to record the user's voice input. The sound of the original media is removed from the recording, such that only the user's voice input plus any music accompaniment remain in the recording. In some embodiments, the lyrics page provides a function for the user to selectively share the recording with friends only or to the public that later displays the lyrics page via the multimedia platform.

In some embodiments, when the lyrics page is displayed, the playback of the original media, the recorded media, or the karaoke version of the original media is selectively started in accordance with a determination of how the play button is invoked. For example, a long tap causes the recording to be started, a normal tap causes the original media to be started, and a hard tap causes the karaoke accompaniment to be started. In some embodiments, in response to the long tap, and in accordance with a determination that no recording exists, the device starts the karaoke accompaniment instead, so that the user can start to make a recording.

In some embodiments, when sharing the lyrics page, the device allows the user to choose to share to a particular friend (e.g., a contact from a contact list), to a group of friends (e.g., a chat group), to all contacts on a public bulletin (e.g., friends' circle), or to all public, depending on the user's selection from a listing of sharing options. In some embodiments, the listing of sharing options include an option to share to others that have made lyrics pages for the same song or media file, irrespective of whether the people are social network contacts of each other on the multimedia platform. In some embodiments, the listing of options include an option to share to people that are following the same public account, such as the public account of the artist of the media file. In some embodiments, the listing of options include an option for sharing to other users that have liked the media file on the multimedia platform. In some embodiments, the sharing option includes an option to prevent sharing of the original or preventing the sharing of the self-recording.

The present disclosure provides a brand-new lyrics display manner, which can achieve an effect similar to a lyrics book, so that a user can collect lyrics that the user likes, for subsequent appreciation, so that an application becomes more humanistic, and an amount of information that a lyrics page can provide is greatly increased. Further, occupation of display space can be greatly reduced in a manner of displaying a part of lyrics information and displaying the multimedia file in discrete pages. Further, a function for producing a lyrics page is provided, so that the user can produce a lyrics page of any pattern that the user prefers, and can view and appreciate the lyrics page at any time, thereby enriching functions of the client.

Figure 11:
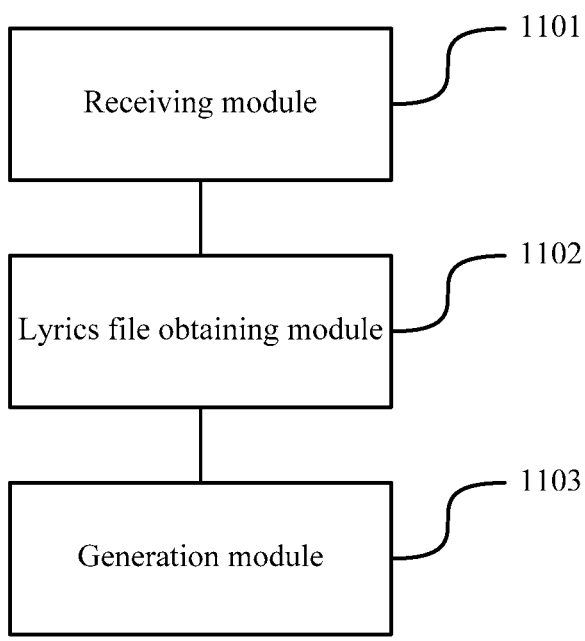
FIG. 11 is a schematic structural diagram of a lyrics page generation apparatus according to an embodiment of the present disclosure.

FIG. 11 is a schematic structural diagram of a lyrics page generation apparatus according to an embodiment of the present disclosure. Referring to FIG. 11, the apparatus includes:

a receiving module 1101, configured to receive a lyrics page generation instruction, the lyrics page generation instruction being used for instructing to display a lyrics page of a selected multimedia file list;

a lyrics file obtaining module 1102, configured to obtain a lyrics file of at least one multimedia file in the multimedia file list; and a generation module 1103, configured to generate a lyrics page according to the lyrics file of the at least one multimedia file, the lyrics page including lyrics information of the at least one multimedia file.

Optionally, the lyrics information displayed on the lyrics page is lyrics information of a specified part of the multimedia file of the at least one multimedia file, and the generation module is further configured to load and display lyrics information of one or more portions of the multimedia file other than the specified part of the multimedia file of the at least one multimedia file on the lyrics page according to a first predefined operation of a user on the lyrics page.

Optionally, the lyrics information displayed on the lyrics page is a part of lyrics information of the at least one multimedia file, and the generation module is further configured to: according to a second predefined operation of a user on lyrics information of any multimedia file of the at least one multimedia file, load and display complete lyrics information of the multimedia file on the lyrics page.

Optionally, the apparatus further includes:

a poster editing module, configured to: jump to a multimedia poster editing page if a third predefined operation of a user on lyrics information of any multimedia file is detected; and load and display lyrics information corresponding to the third predefined operation on the multimedia poster editing page.

Optionally, the apparatus further includes:

a resource obtaining module, configured to obtain a lyrics page production resource, the lyrics page production resource including multiple background files; and a background file obtaining module, configured to obtain, from the multiple background files, a specified background file selected by a user; and correspondingly, the generation module being configured to generate the lyrics page of the at least one multimedia file according to the specified background file and the lyrics file of the at least one multimedia file.

Optionally, the apparatus further includes:

a sharing module, configured to share the lyrics page to a target platform if a sharing operation on the lyrics page is detected.

Optionally, the apparatus further includes:

an adding module, configured to: when an adding instruction of adding a first multimedia file to the multimedia file list is received, add the first multimedia file in the multimedia file list, and add lyrics information of the first multimedia file in the lyrics page; or a deletion module, configured to: when a deletion instruction of a first multimedia file in the multimedia file list is received, deleting the first multimedia file from the multimedia file list, and deleting lyrics information of the first multimedia file from the lyrics page.

It should be noted that when the lyrics page generation apparatus provided in the foregoing embodiment generates a lyrics page, descriptions are provided only by using division of the foregoing various functional modules as an example. In actual application, the foregoing functions may be allocated to be accomplished by different functional modules according to requirements, that is, the internal structure of the apparatus is divided into different functional modules, to accomplish all or a part of functions of the foregoing scanning. Besides, the lyrics page generation apparatus provided in the foregoing embodiment and embodiments of the lyrics page generation method belong to a same concept. Refer to the method embodiments for details of a specific implementation process. Details are not described herein.

Figure 12:
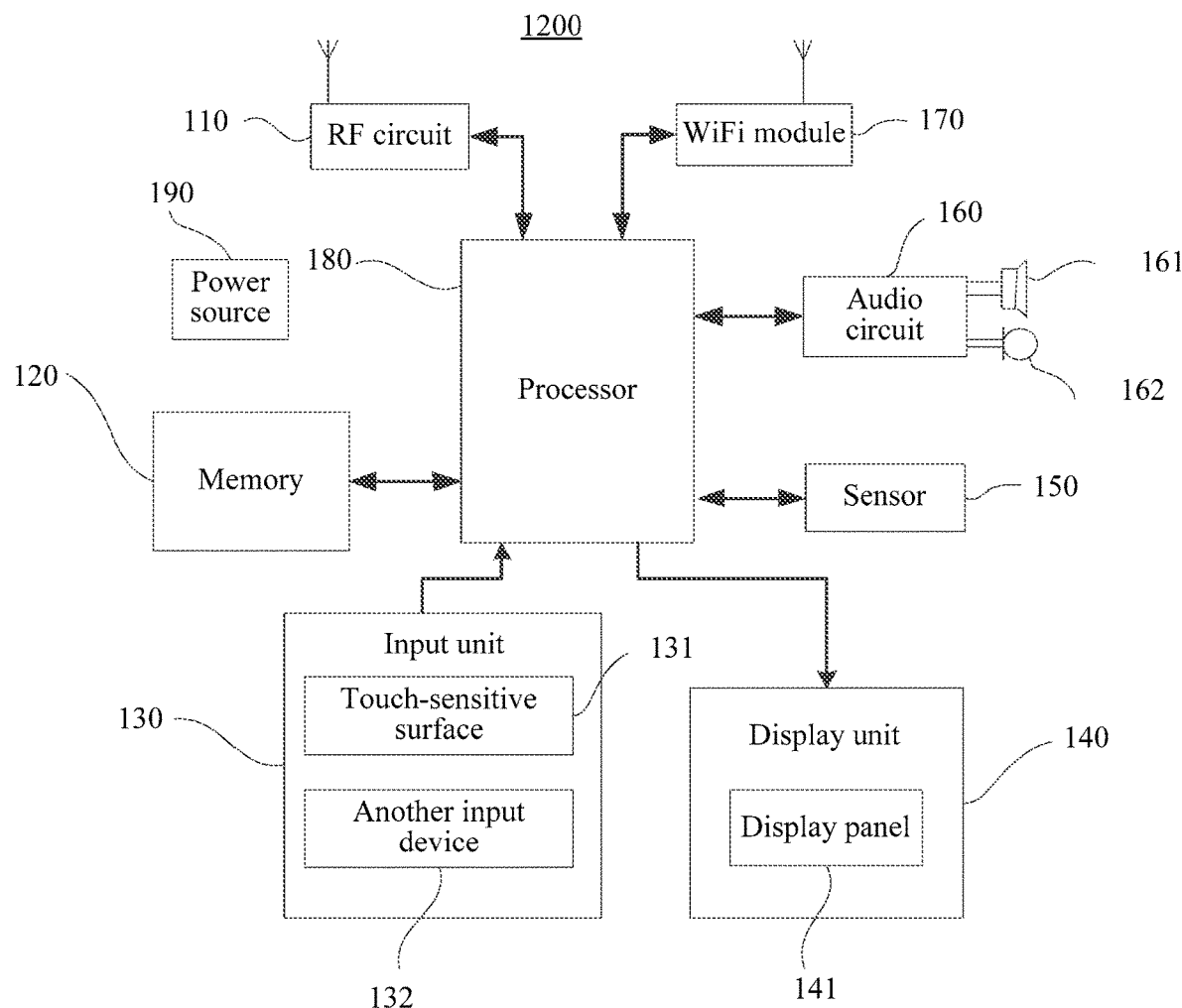
FIG. 12 is a block structural diagram of a terminal according to an embodiment of the present disclosure.

An embodiment of the present disclosure provides a terminal, and the terminal may be configured to perform the lyrics page generation method provided in the foregoing embodiments. Referring to FIG. 12, the terminal 1200 includes:

The terminal 1200 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power source 190. A person skilled in the art would understand that the structure of the terminal shown in FIG. 12 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a turner, one or more oscillators, a subscriber identity module (SIM) card, a transceiver, a coupler, an LNA (Low Noise Amplifier, low noise amplifier), a duplexer, and the like. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, to provide accesses of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1200. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 12, the touch-sensitive surface 131 and the display panel 141 are used as two separate parts to implement input and output functions, in some embodiments, the touch-sensitive surface 131 and the display panel 141 may be integrated to implement the input function and output functions.

The terminal 1200 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 1200 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal device 1200, are not further described herein.

The audio circuit 160, a speaker 161, and a microphone 162 may provide audio interfaces between the user and the terminal 1200. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

WiFi belongs to a short distance wireless transmission technology. The terminal 1200 may help, by using the WiFi module 170, a user to receive and send an email, browse a web page, and access stream media, and the like, which provides wireless broadband Internet access for the user. Although FIG. 12 shows the WiFi module 170, it can be understood that the WiFi module 170 does not belong to a necessary constitution of the terminal 1200, and can be ignored according to demands without changing the scope of the essence of the present disclosure.

The processor 180 is a control center of the terminal 1200, and connects to various parts of the mobile phone by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application, and the like, and the modem mainly processes wireless communication. It can be understood that the foregoing modem may either not be integrated into the processor 180.

The terminal 1200 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component such as one or more direct current or alternate current power supplies, a recharging system, a power supply fault detection circuit, a power supply converter or an inverter, and a power supply state indicator.

Although not shown in the figure, the terminal 1200 may further include a camera, a Bluetooth module, and the like, which are not further described herein. Specifically, in this embodiment, the display unit of the terminal is a touchscreen display, and the terminal further includes a memory and one or more programs. The one or more programs are stored in the memory and configured to be executed by one or more processors. The one or more programs contain instructions used for performing any operation at the client side.

Figure 13:
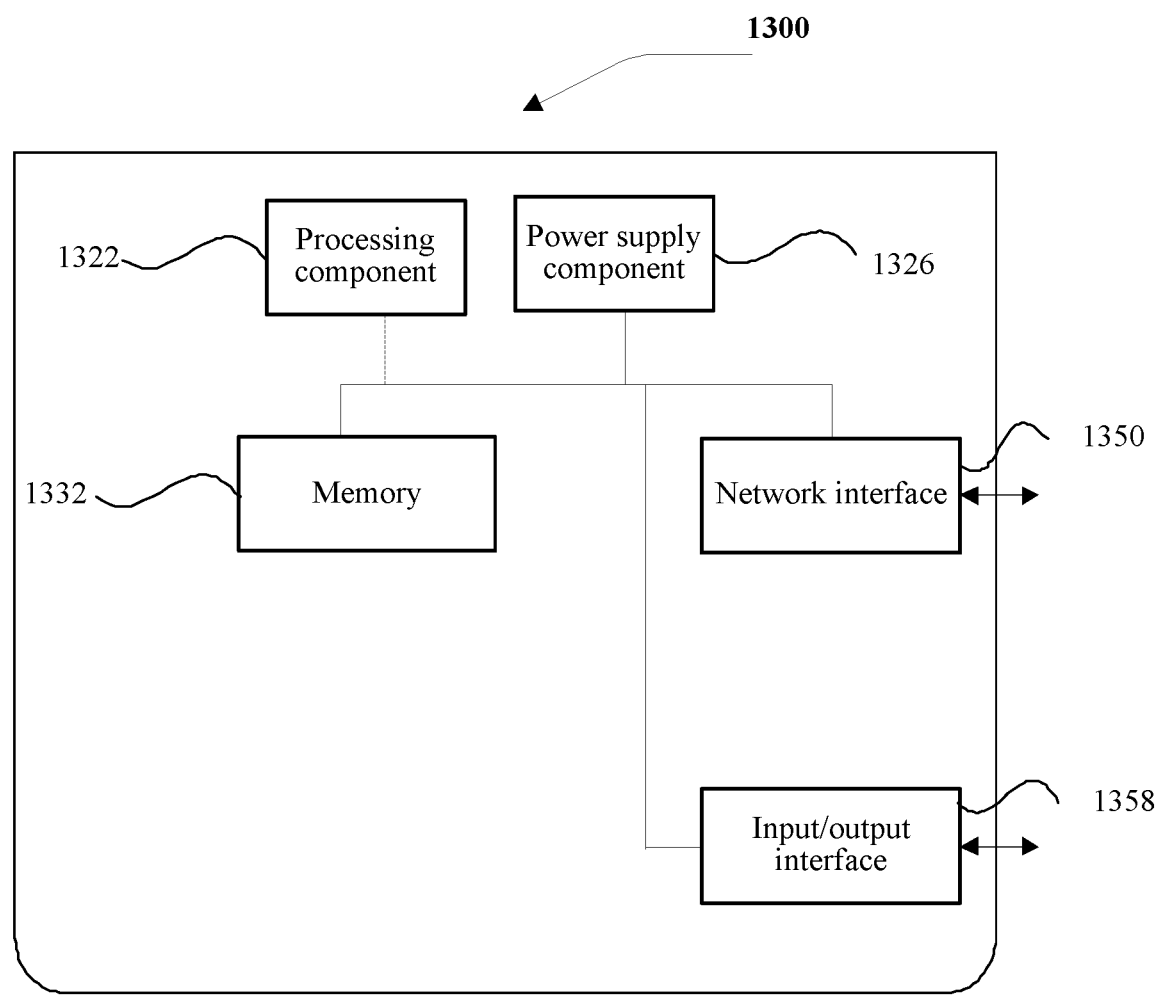
FIG. 13 is a block diagram of a lyrics page generation apparatus 1300 shown according to an exemplary embodiment.

FIG. 13 is a block diagram of a lyrics page generation apparatus 1300 shown according to an exemplary embodiment. For example, the apparatus 1300 may be provided as a server. Referring to FIG. 13, the apparatus 1300 includes a processing component 1322 and further includes one or more processors, and memory resources represented by a memory 1332, used for storing instructions that can be executed by the processing component 1322, for example, an application. The application stored in the memory 1332 may include one or more modules of which each corresponds to a group of instructions. The processing component 1322 is configured to execute instructions, to perform the lyrics page generation method.

The apparatus 1300 may further include: a power supply component 1326, configured to execute power supply management of the apparatus 1300; one wired or wireless network interface 1350, configured to connect the apparatus 1300 to a network; and an input/output (I/O) interface 1358. The apparatus 1300 may operate an operating system stored in the memory 1332, for example, Windows Server™, Mac OS X™, Unix™, Linux™, FreeBSD™, or the like.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall all fall within the protection scope of the present disclosure.

What is claimed is:

1. A method for generating an interactive lyrics page, the method comprising:
　at a device having one or more processors and memory:
　　receiving a lyrics page generation instruction, the lyrics page generation instruction being used for generating a lyrics page of a selected multimedia file list;
　　obtaining a first lyrics file of a first multimedia file in the multimedia file list and a second lyrics file of a second multimedia file in the multimedia file list;
　　generating a first interactive lyrics page according to the first lyrics file and the second lyrics file, including overlaying lyrics text from the first lyrics file and lyrics text from the second lyrics file on a single background page;

displaying the first interactive lyrics page;

detecting a first user input directed to the lyrics text from the first lyrics file displayed on the first interactive lyrics page; and in response to detecting the first user input directed to the lyrics text from the first lyrics file displayed on the first interactive lyrics page:

in accordance with a determination that the first user input is directed to a first sub-portion of the lyrics text from the first lyrics file displayed on the first interactive lyrics page, starting playback of the first multimedia file from a first location corresponding to the first sub-portion of the lyrics text from the first lyrics file; and in accordance with a determination that the first user input is directed to a second sub-portion of the lyrics text, distinct from the first sub-portion of the lyrics text, from the first lyrics file displayed on the first interactive lyrics page, starting playback of the first multimedia file from a second location, distinct from the first location, corresponding to the second sub-portion of the lyrics text from the first lyrics file; and detecting a second user input directed to a third sub-portion of the lyrics text from the first lyrics file displayed on the first interactive lyrics page;

in response to detecting the second user input:

starting playback of a karaoke music of the first multimedia file from a third location corresponding to the third sub-portion of the lyrics text from the first lyrics file;

detecting and recoding a voice input of the user together with music accompaniment from the karaoke music of the first multimedia file; and sharing the first interactive lyrics page to a target platform in response to detecting a sharing operation on the first interactive lyrics page, wherein the first interactive lyrics page for sharing includes an option to playback the recorded voice input of the user together with the music accompaniment from the karaoke music of the first multimedia file.

2. The method according to claim 1, including:

loading and displaying additional lyrics text from the first lyrics file on the first interactive lyrics page according to a first predefined operation of a user on the first interactive lyrics page.

3. The method according to claim 1, wherein the lyrics text displayed on the first interactive lyrics page is a part, less than all, of lyrics information of the first and second multimedia files, and the method further comprises:

according to a second predefined operation of a user on the lyrics text from a respective one of the first and second lyrics files displayed on the first interactive lyrics page, loading and displaying complete lyrics information of the respective one of the first and second lyrics file on the first interactive lyrics page.

4. The method according to claim 1, including:

jumping to a multimedia poster editing page in response to detecting a third predefined operation of a user on the lyrics text of a respective one of the first and second lyrics files displayed on the first interactive lyrics page.

5. The method according to claim 1, including:

obtaining a lyrics page production resource, the lyrics page production resource comprising multiple background files; and obtaining, from the multiple background files, a specified background file selected by a user, wherein the specified background file is used as the single background page of the first interactive lyrics page.

6. The method according to claim 1, including:

in accordance with a determination that an adding instruction of adding a third multimedia file to the multimedia file list is received, adding the third multimedia file in the multimedia file list, and adding lyrics information of the third multimedia file in the first interactive lyrics page; and in accordance with a determination that a deletion instruction of a respective multimedia file in the multimedia file list is received, deleting the respective multimedia file from the multimedia file list, and deleting lyrics information of the respective multimedia file from the first interactive lyrics page.

7. A system, comprising:

one or more processors and memory, the memory storing instructions, which, when executed by the one or more processors, cause the processors to perform operations comprising:

receiving a lyrics page generation instruction, the lyrics page generation instruction being used for generating a lyrics page of a selected multimedia file list;

obtaining a first lyrics file of a first multimedia file in the multimedia file list and a second lyrics file of a second multimedia file in the multimedia file list;

generating a first interactive lyrics page according to the first lyrics file and the second lyrics file, including overlaying lyrics text from the first lyrics file and lyrics text from the second lyrics file on a single background page;

displaying the first interactive lyrics page;

detecting a first user input directed to the lyrics text from the first lyrics file displayed on the first interactive lyrics page; and in response to detecting the first user input directed to the lyrics text from the first lyrics file displayed on the first interactive lyrics page:

in accordance with a determination that the first user input is directed to a first sub-portion of the lyrics text from the first lyrics file displayed on the first interactive lyrics page, starting playback of the first multimedia file from a first location corresponding to the first sub-portion of the lyrics text from the first lyrics file; and in accordance with a determination that the first user input is directed to a second sub-portion of the lyrics text, distinct from the first sub-portion of the lyrics text, from the first lyrics file displayed on the first interactive lyrics page, starting playback of the first multimedia file from a second location, distinct from the first location, corresponding to the second sub-portion of the lyrics text from the first lyrics file; and detecting a second user input directed to a third sub-portion of the lyrics text from the first lyrics file displayed on the first interactive lyrics page;

in response to detecting the second user input:

starting playback of a karaoke music of the first multimedia file from a third location corresponding to the third sub-portion of the lyrics text from the first lyrics file;

detecting and recoding a voice input of the user together with music accompaniment from the karaoke music of the first multimedia file; and sharing the first interactive lyrics page to a target platform in response to detecting a sharing operation on the first interactive lyrics page, wherein the first interactive lyrics page for sharing includes an option to playback the recorded voice input of the user together with the music accompaniment from the karaoke music of the first multimedia file.

8. The system according to claim 7, wherein the operations include:
   loading and displaying additional lyrics text from the first lyrics file on the first interactive lyrics page according to a first predefined operation of a user on the first interactive lyrics page.

9. The system according to claim 7, wherein the lyrics text displayed on the first interactive lyrics page is a part, less than all, of lyrics information of the first and second multimedia files, and the operations include:
   according to a second predefined operation of a user on the lyrics text from a respective one of the first and second lyrics files displayed on the first interactive lyrics page, loading and displaying complete lyrics information of the respective one of the first and second lyrics file on the first interactive lyrics page.

10. The system according to claim 7, wherein the operations include:
    jumping to a multimedia poster editing page in response to detecting a third predefined operation of a user on the lyrics text of a respective one of the first and second lyrics files displayed on the first interactive lyrics page.

11. The system according to claim 7, wherein the operations include:
    obtaining a lyrics page production resource, the lyrics page production resource comprising multiple background files; and
    obtaining, from the multiple background files, a specified background file selected by a user, wherein the specified background file is used as the single background page of the first interactive lyrics page.

12. The system according to claim 7, wherein the operations include:
    in accordance with a determination that an adding instruction of adding a third multimedia file to the multimedia file list is received, adding the third multimedia file in the multimedia file list, and adding lyrics information of the third multimedia file in the first interactive lyrics page; and
    in accordance with a determination that a deletion instruction of a respective multimedia file in the multimedia file list is received, deleting the respective multimedia file from the multimedia file list, and deleting lyrics information of the respective multimedia file from the first interactive lyrics page.

13. A non-transitory computer-readable storage medium storing instructions, the instructions, when executed by one or more processors, cause the processors to perform operations comprising:
    receiving a lyrics page generation instruction, the lyrics page generation instruction being used for generating a lyrics page of a selected multimedia file list;
    obtaining a first lyrics file of a first multimedia file in the multimedia file list and a second lyrics file of a second multimedia file in the multimedia file list;
    generating a first interactive lyrics page according to the first lyrics file and the second lyrics file, including overlaying lyrics text from the first lyrics file and lyrics text from the second lyrics file on a single background page;
    displaying the first interactive lyrics page;
    detecting a first user input directed to the lyrics text from the first lyrics file displayed on the first interactive lyrics page; and
    in response to detecting the first user input directed to the lyrics text from the first lyrics file displayed on the first interactive lyrics page:
       in accordance with a determination that the first user input is directed to a first sub-portion of the lyrics text from the first lyrics file displayed on the first interactive lyrics page, starting playback of the first multimedia file from a first location corresponding to the first sub-portion of the lyrics text from the first lyrics file; and
       in accordance with a determination that the first user input is directed to a second sub-portion of the lyrics text, distinct from the first sub-portion of the lyrics text, from the first lyrics file displayed on the first interactive lyrics page, starting playback of the first multimedia file from a second location, distinct from the first location, corresponding to the second sub-portion of the lyrics text from the first lyrics file; and
    detecting a second user input directed to a third sub-portion of the lyrics text from the first lyrics file displayed on the first interactive lyrics page;
    in response to detecting the second user input:
       starting playback of a karaoke music of the first multimedia file from a third location corresponding to the third sub-portion of the lyrics text from the first lyrics file; and
       detecting and recoding a voice input of the user together with music accompaniment from the karaoke music of the first multimedia file; and
    sharing the first interactive lyrics page to a target platform in response to detecting a sharing operation on the first interactive lyrics page, wherein the first interactive lyrics page for sharing includes an option to playback the recorded voice input of the user together with the music accompaniment from the karaoke music of the first multimedia file.

14. The non-transitory computer-readable storage medium according to claim 13, wherein the operations include:
    loading and displaying additional lyrics text from the first lyrics file on the first interactive lyrics page according to a first predefined operation of a user on the first interactive lyrics page.

15. The non-transitory computer-readable storage medium according to claim 13, wherein the lyrics text displayed on the first interactive lyrics page is a part, less than all, of lyrics information of the first and second multimedia files, and the operations include:
    according to a second predefined operation of a user on the lyrics text from a respective one of the first and second lyrics files displayed on the first interactive lyrics page, loading and displaying complete lyrics information of the respective one of the first and second lyrics file on the first interactive lyrics page.

16. The non-transitory computer-readable storage medium according to claim 13, wherein the operations include:
    jumping to a multimedia poster editing page in response to detecting a third predefined operation of a user on the lyrics text of a respective one of the first and second lyrics files displayed on the first interactive lyrics page.

17. The non-transitory computer-readable storage medium according to claim 13, wherein the operations include:

obtaining a lyrics page production resource, the lyrics page production resource comprising multiple background files; and obtaining, from the multiple background files, a specified background file selected by a user, wherein the specified background file is used as the single background page of the first interactive lyrics page.

* * * * *